United States Patent
Jiao

(10) Patent No.: US 10,498,113 B2
(45) Date of Patent: Dec. 3, 2019

(54) METHODS AND DEVICES FOR AUTOMATIC COMMUNICATION ADDRESSING OF LOAD CENTER BREAKERS

(71) Applicant: Eaton Corporation, Cleveland, OH (US)

(72) Inventor: Jian Jiao, Sewickley, PA (US)

(73) Assignee: Eaton Intelligent Power Limited, Dublin (IE)

( * ) Notice: Subject to any disclaimer, the term of this patent is extended or adjusted under 35 U.S.C. 154(b) by 324 days.

(21) Appl. No.: 15/623,991

(22) Filed: Jun. 15, 2017

(65) Prior Publication Data

US 2018/0366920 A1    Dec. 20, 2018

(51) Int. Cl.
   *H02H 3/00* (2006.01)
   *H02B 1/24* (2006.01)
   *H01H 71/04* (2006.01)

(52) U.S. Cl.
   CPC .............. *H02B 1/24* (2013.01); *H02H 3/006* (2013.01); *H01H 71/04* (2013.01); *H01H 2300/03* (2013.01)

(58) Field of Classification Search
   None
   See application file for complete search history.

(56) References Cited

U.S. PATENT DOCUMENTS 6,195,243 B1 * 2/2001 Spencer ................... H02H 3/00
                                                        361/64
6,564,278 B1 * 5/2003 Olson ................... G06F 13/409
                                                       710/300

* cited by examiner

*Primary Examiner* — Stephen W Jackson
(74) *Attorney, Agent, or Firm* — Myers Bigel, P.A.

(57) ABSTRACT

An electrical distribution panel includes a primary breaker, an auxiliary breaker, and a resistive element that is electrically connected between the primary breaker and the auxiliary breaker. The resistive element is configured to provide a resulting signal based on a voltage drop of a signal from the primary breaker to the auxiliary breaker. A communication address of the auxiliary breaker is based on the voltage drop of the signal from the primary breaker to the auxiliary breaker. Related methods and devices are also discussed.

20 Claims, 5 Drawing Sheets

METHODS AND DEVICES FOR AUTOMATIC COMMUNICATION ADDRESSING OF LOAD CENTER BREAKERS

FIELD

The present disclosure generally relates to electrical distribution panels, such as load centers and, more particularly to circuit breakers in load centers.

BACKGROUND

Electrical distribution panels, such as load centers, include electrical buses that have conductors permitting electrical current to be carried throughout the electrical load center. Electrical busses may contain features permitting attachment of fuses, relays, switches, wires, breakers, and other electrical elements. Some load centers also include circuit breakers connected to the electrical busses at specific points within the load centers. Circuit breakers, also referred to as "breakers" are one of a variety of overcurrent protection devices used for circuit protection and isolation. The breaker provides electrical protection whenever an electric abnormality occurs. In a typical circuit breaker, current enters the system from a power line and passes through a line conductor to a breaker that is attached to a device that is protected by the breaker. In other words, a breaker protects a down-stream electrical device that is connected to the breaker. An electrical distribution panel may include a primary breaker that is electrically connected to one or more auxiliary breakers. The primary breaker may need to communicate with individual auxiliary breakers.

SUMMARY

Embodiments described herein include methods and devices for electrical distribution panels and/or load centers that are configured for automatic communication addressing of the load center breakers. In some embodiments, an electrical distribution panel includes a primary breaker, an auxiliary breaker, and a resistive element that is electrically connected between the primary breaker and the auxiliary breaker. The resistive element is configured to provide a resulting signal based on a voltage drop of a signal from the primary breaker to the auxiliary breaker. A communication address of the auxiliary breaker is based on the voltage drop of the signal from the primary breaker to the auxiliary breaker.

According to some embodiments, the auxiliary breaker may be a first auxiliary breaker, the resistive element may be a first resistive element. The first resistive element is electrically connected to the primary breaker at a first port of the first resistive element and is electrically connected to the first auxiliary breaker at a second port of the first resistive element. The electrical distribution panel may include one or more additional auxiliary breakers and one or more additional resistive elements associated with respective ones of the one or more additional auxiliary breakers. A first one of the one or more additional resistive elements may be electrically connected to the first auxiliary breaker and the first resistive element at a first port of the first one of the one or more additional resistive elements. The first one of the one or more additional resistive elements may be electrically connected to a respective one of the one or more additional auxiliary breakers at a second port of the first one of the one or more additional resistive elements. Respective communication addresses of the one or more additional auxiliary breakers may be based on respective voltage drops of respective signals across respective ones of the one or more additional resistive elements. Remaining ones of the one or more additional resistive elements may be electrically connected to a previous one of the one or more additional resistive elements and electrically connected to a previous one of the one or more additional auxiliary breakers at a respective first port of the remaining ones of the one or more additional resistive elements, and may be electrically connected to respective ones of the one or more additional auxiliary breakers at a respective second port of the remaining ones of the one or more additional resistive elements. In some embodiments, resistance values of each of the one or more additional resistive elements are the same as a resistance value of the first resistive element.

According to some embodiments, the electrical distribution panel may include a terminating resistor electrically connected from a first port of the terminating resistor to the respective second port of a last one of the remaining ones of the one or more additional resistive elements, and electrically connected to ground from a second port of the terminating resistor. The signal may include a single phase electrical signal associated with a single port of the primary breaker. The single port of the primary breaker may include a first port of the primary breaker, and the single phase electrical signal may include a first single phase electrical signal. The primary breaker may include a second port associated with a second single phase electrical signal whose phase is different from that of the first single phase electrical signal. The electrical distribution panel may include one or more second single phase auxiliary breakers and one or more second single phase resistive elements associated with respective ones of the one or more second single phase auxiliary breakers. A first port of the first one of the one or more second single phase resistive elements may be electrically connected to the second port of the primary breaker. A second port of the first one of the one or more second single phase resistive elements may be electrically connected to a first one of the one or more second single phase auxiliary breakers. Respective first ports of remaining ones of the one or more second single phase resistive elements may be electrically connected to a second port of a previous one of the one or more second single phase resistive elements and/or electrically connected to a respective one of the one or more second single phase auxiliary breakers.

According to some embodiments, the auxiliary breaker may include a noise rejecting filter that reduces noise in the resulting signal to produce a noise-reduced signal that is input to a processor. The auxiliary breaker may include a processor configured to perform operations including determining an input voltage of an input signal associated with the resulting signal, and determining that the resulting signal is addressed to the auxiliary breaker, responsive to the input voltage being within a voltage range. The processor may be further configured to perform operations including controlling the operation of the auxiliary breaker, responsive to the determining that the resulting signal is addressed to the auxiliary breaker.

According to some embodiments, determining that the resulting signal is addressed to the auxiliary breaker, responsive to the input voltage being within the voltage range may include mapping the input voltage to an address value, quantizing the address value to an allowable address value, and determining that the resulting signal is addressed to the auxiliary breaker based on the allowable address value being associated with the auxiliary breaker. The one or more additional auxiliary breakers may include respective one or more processors that are configured to perform operations including determining a respective input voltage of a respective input signal available to the respective one of the one or more processors, and determining that the respective input signal is addressed to the respective one of the one or more auxiliary breakers, responsive to the respective input voltage being within a respective voltage range.

Some embodiments may be directed to a method of managing a load center breaker. The method includes receiving, by a processor of the load center breaker, an input signal associated with a signal from a primary breaker whose voltage has been scaled by a resistive element that is electrically connected between the load center breaker and the primary breaker, determining, by the processor of the load center breaker, an input voltage based on the input signal, and determining, by the processor of the load center breaker, that the input signal is addressed to the load center breaker based on the input voltage.

According to some embodiments, the method may include controlling the operation of the load center breaker, responsive to the determining that the input signal is addressed to the load center breaker. The input signal may be responsive to a noise rejecting filter between the resistive element and the primary breaker. Determining that the input signal is addressed to the load center breaker based on the input voltage may include determining that the input voltage is within a voltage range associated with the load center breaker. Determining that the input voltage is within the voltage range may include mapping the input voltage to an address value, quantizing the address value to an allowable address value, and determining that the input signal is addressed to the load center breaker based on the allowable address value being associated with the load center breaker.

Some embodiments may be directed to a primary breaker in a load center. The primary breaker includes a processor that is configured to perform operations including transmitting, by the processor of the primary breaker, a signal that is addressed to an auxiliary breaker based on a voltage drop of the signal across a resistor that is electrically connected between the primary breaker and the auxiliary breaker.

Further features, advantages and details of the present invention will be appreciated by those of ordinary skill in the art from a reading of the figures and the detailed description of the preferred embodiments that follow, such description being merely illustrative of the present invention.

It is noted that aspects of the invention described with respect to one embodiment, may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail in the specification set forth below.

DETAILED DESCRIPTION OF EMBODIMENTS

Figure 1:
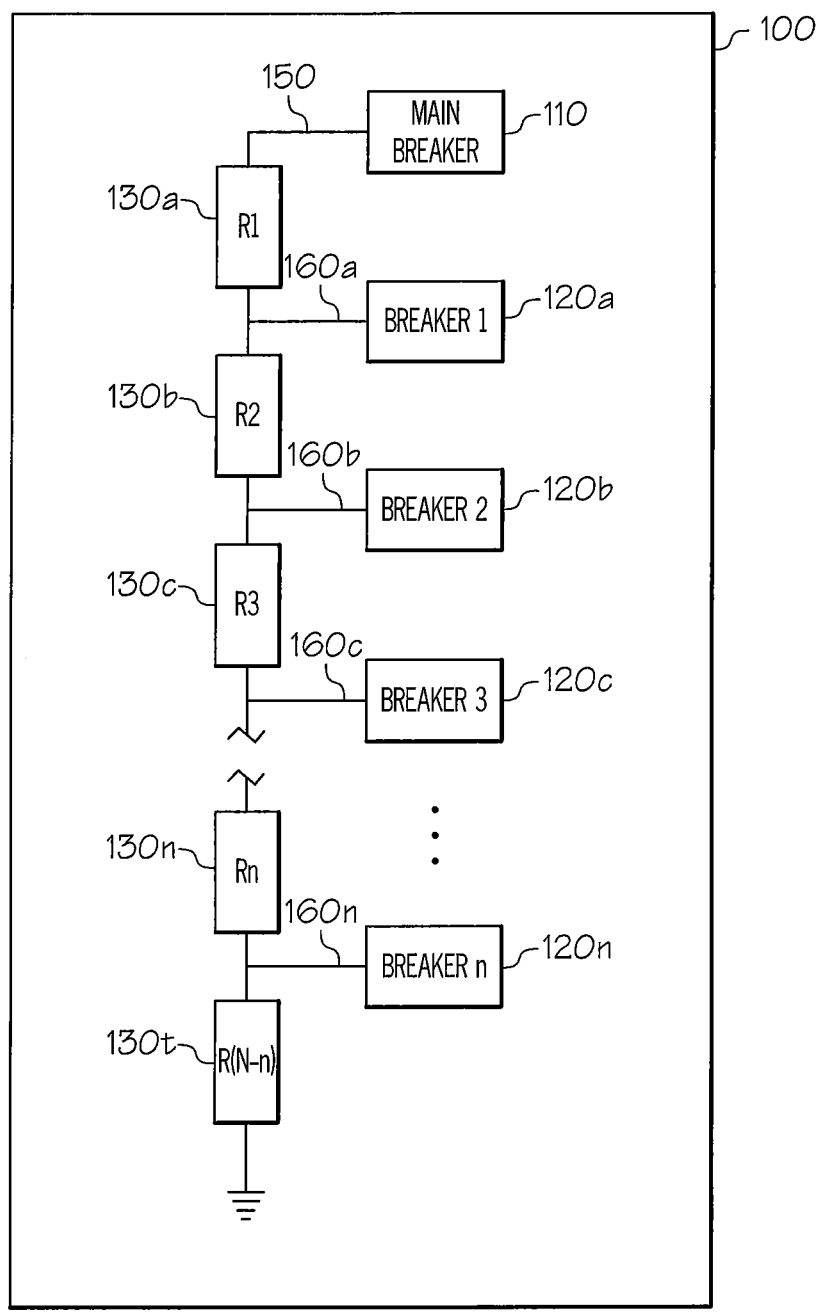
FIG. 1 is a schematic illustration of an electrical distribution panel, according to some embodiments of the present invention.

Various embodiments will be described more fully hereinafter with reference to the accompanying drawings. Other embodiments may take many different forms and should not be construed as limited to the embodiments set forth herein. Like numbers refer to like elements throughout. Abbreviated versions of the word "Figure" such as "FIG." and "Fig." are used interchangeably in the application.

In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90° or at other orientations) and the spatially relative descriptors used herein interpreted accordingly.

The term "about" refers to numbers in a range of +/−20% of the noted value.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Elements "connected" or "coupled" to one another may refer to physical and/or electrical connections or couplings between the elements. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

Next generation load centers may be Internet of Things (IoT) load centers that connect to a variety of devices such as IoT devices. These IoT devices may need circuit breakers, also referred to as "breakers", to prevent electrical damage to the devices in the event of an electrical malfunction. Legacy systems may include individual electro-magnetic circuit breakers (EMCB) that have a WiFi internet connection in each breaker. In order to reduce costs, a single internet connection to the load center to communicate with multiple IoT devices and/or breakers may be implemented. In this configuration, a digital main breaker, also referred to as the "main breaker" or the "primary breaker", may include an internet connection. Several digital branch breakers, also referred to as "auxiliary breakers", communicate with the main breaker. It may be desired to have simple installation and operational processes for the load center, with few wires, and breakers that are "plug and play".

Various embodiments described herein may arise from the recognition that the auxiliary breakers need a communication address such that the primary breaker may communicate with individual auxiliary breakers. Specifically, solutions to perform automatic communication address configuration based on specific circuit configurations will be described herein. A load center wiring concept for automatic address configuration as well as a circuit configuration within each breaker will be discussed. The solutions described herein provide a robust, scalable solution for addressing a large number of auxiliary breakers that are in communication with a single primary breaker.

Referring now to FIG. 1, an electrical distribution panel 100, such as a load center, is illustrated. The electrical distribution panel 100 may include a primary breaker 110 that is electrically connected one or more auxiliary breakers 120a-120n. Auxiliary breakers 120a-120n that are all connected to one branch of primary breaker 110 may operate at the same power phase since the signal from a single port of the primary breaker 110 may be a single phase electrical signal. The primary breaker 110 may be connected through one or more resistive elements 130a-130n to auxiliary breakers 120a-120n. The resistive elements 130a-130n between the primary breaker 110 and the auxiliary breakers 120a-120n form voltage dividers of the signal 150 from the primary breaker 110. Specifically, each of the resistive elements 130a-130n may induce a voltage drop of a signal from the primary breaker to the auxiliary breaker. A communication address of an auxiliary breaker may be based on the voltage drop of the signal from the primary breaker to the auxiliary breaker. Auxiliary breakers 120a-120n may have respective input signals 160a-160n that result from voltage drops across resistive elements. The circuit may include a terminating resistor 130t that is connected to ground. The terminating resistor 130t may be electrically connected from a first port of the terminating resistor 130t to the respective second port of a last one of the resistive elements 130n that is electrically farthest away from the primary breaker 110. The terminating resistor 130t may be electrically connected to ground from a second port of the terminating resistor 130t.

Operation of the electrical distribution panel 100 of FIG. 1 will be discussed in the context of an illustrative example. For this example, n=50, indicating 50 auxiliary breakers 120a-120n. In some embodiments, all resistive elements 130a-130n may have a same resistance value such as, for example, 1 kΩ Although any combinations of resistance values may be selected, using the same values for each of the resistive elements 130a-130n would ease the construction of the electrical distribution panel 100 as well as calculations for the voltage divider circuit. In the example of each resistive element 130a-130n being 1 kΩ the total load viewed by the primary breaker 110 is 50 kΩ. If signal 150 that is output from primary breaker 110 has a DC voltage component of 3.3V, a voltage drop of 0.066V (3.3V/50) may occur across each of the resistive elements 130a-130n, since these behave as voltage dividers.

Figure 2:
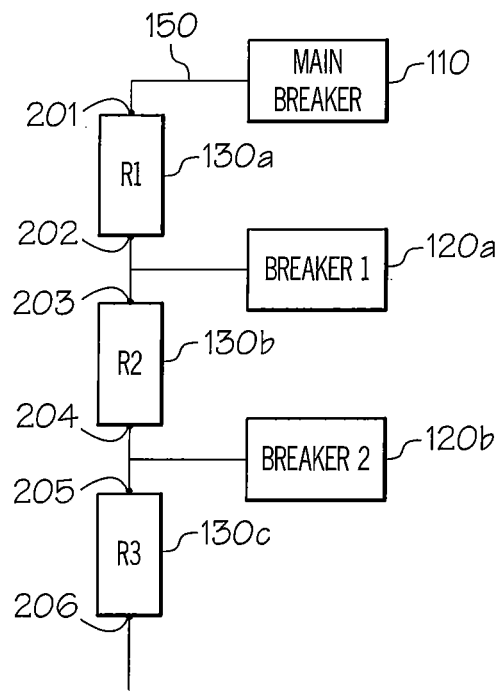
FIG. 2 is a schematic illustration of a portion of an electrical distribution panel including a primary breaker and auxiliary breakers, according to some embodiments of the present invention.

FIG. 2 illustrates a portion of an electrical distribution panel of FIG. 1, including details of the electrical connections between the primary breaker and auxiliary breakers. Primary breaker 110 is connected to a first port 201 of resistive element 130a. A second port 202 of resistive element 130a is connected to auxiliary breaker 120a and a first port 203 of resistive element 130b. A second port 204 of resistive element 130b is connected to auxiliary breaker 120b and a first port 205 of resistive element 130c. Depending upon the number of auxiliary breakers, resistive element 130c may be a terminating resistor whose second port 206 may be connected to ground or may be connected to another auxiliary breaker.

Figure 3:
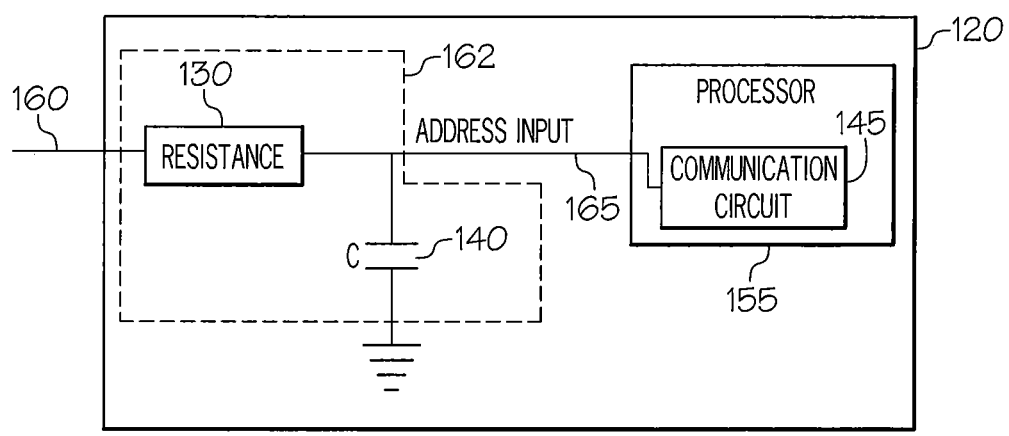
FIG. 3 is a schematic illustration of a breaker, according to some embodiments of the present invention.

FIG. 3 is a schematic illustration of an auxiliary breaker 120. In some embodiments, the breaker of FIG. 3 may also represent a primary breaker. Auxiliary breaker 120 may have an input signal 160, which may be analogous to any of auxiliary breaker input signals 160a-160n of FIG. 1. A resistive element 130 and a capacitive element 140 may operate as a noise rejecting filter 162 to reduce noise on the input signal 160 that is based on output signal 150 from the primary breaker 110 of FIG. 1. The filtered signal 165 that has been filtered by the noise rejecting filter 162 may serve as an address input 165 to processor 155. A level-sensitive input pin on processor 155 may be used. The level-sensitive input pin of processor 155 may be configured as analog input or digital output by rewriting control registers associated with the pin. Although processor 155 may conventionally be used for arc fault and ground fault detection, the processor may be further configured to determine a voltage level of an input signal. Specifically, the processor 155 may measure the voltage of the signal 165 at a level-sensitive input pin on processor 155. The sensitivity or accuracy of the level-sensitive input pin on processor 155 may be, for example, 1% of the maximum voltage of the input signal 160 of the breaker in order to distinguish between the n=50 auxiliary breakers in the ongoing example, since 2% of the maximum voltage of the signal from the primary breaker may be allotted to each of the n=50 auxiliary breakers.

Still referring to FIG. 3, the processor 155 may determine that the input signal 160 is addressed to the auxiliary breaker 120 if the voltage of input signal 160 is within a voltage range. Specifically, the processor 155 of auxiliary breaker 120 may map the voltage of the address input 165 to an address value. The address value may be quantized to an allowable address value. The processor 155 may determine that the address input signal 165 is addressed to the auxiliary breaker 120 based on the allowable address value being associated with the auxiliary breaker.

Still referring to FIG. 3, for example, resistive element 130 may have a resistance value of 5 kΩ and capacitive element 140 may have a capacitance value of 1 nF. Using the example of n=50 auxiliary breakers, the voltage for auxiliary breaker #1, corresponding to auxiliary breaker 120a of FIG. 1, after a voltage drop across resistive element 130a of FIG. 1, would be V=(49/50)*3.3V=3.234V. If this voltage is translated to a 10 bit address AD, AD value=1003 such that a range of 996 to 1010 based on 1% accuracy on either side of the midpoint, would qualify the voltage of the signal for auxiliary breaker #1. Similarly, the voltage for auxiliary breaker #2, corresponding to auxiliary breaker 120b of FIG. 1, after a voltage drop across resistive element 130b of FIG. 1, would be V=(48/50)*3.3V=3.168V. If this voltage is translated to a 10 bit address AD, AD value=983 such that a range of 976 to 990 would qualify the voltage of the signal for auxiliary breaker #2. As such, respective voltage drops across resistive elements 130a-130n qualify the respective input signals 160a-160n that are input to the respective auxiliary breakers 120a-120n of FIG. 1. In other words, respective processors of the auxiliary breakers 120a-120n would identify the given ranges of voltages as being addressed to the given auxiliary breaker.

The electrical distribution panel may apply a polling mode of communication. The primary breaker 110 polls one of the auxiliary breakers 120, such that the intended auxiliary breaker answers the primary breaker 110 with a data report. Other auxiliary breakers 120 may be at a high impedance state when the intended auxiliary breaker 120 is communicating with the primary breaker. In some embodiments, an auxiliary breaker 120 may use qualification of a received communication signal being in a given voltage range in conjunction with an address in the communication from the primary breaker 110 to qualify that the signal is intended for the given auxiliary breaker 120. In other words, the auxiliary breaker 120 may not be aware of the address that the primary breaker 110 has assigned to it, but, based on the voltage level of the received signal and the destination address in the communication, would qualify if the communication is intended for the given breaker. If the communication from the primary breaker 110 is not for the given auxiliary breaker 120, the auxiliary breaker 120 enters a high impedance state. The level-sensitive input pin in each auxiliary breaker 120 used for measuring the voltage signal may be configured as analog input, such that it appears as a high impedance to the circuit connected to this pin when this pin is not driven as an output. If the communication form the primary breaker 110 is for the given auxiliary breaker 120, the auxiliary breaker 120 enters an output state and then sends a report back to the primary breaker 110.

Still referring to FIG. 3, processor 155 of the auxiliary breaker 120 may control the operation of the auxiliary breaker 120, responsive to the determining that the input signal 160 is addressed to the auxiliary breaker 120. The auxiliary breaker 120 may send a data report to the main breaker 110, using the destination address that was received from the primary breaker 110 as the source address of the data report. Based on the source address of the data report from the auxiliary breaker 120, the primary breaker 110 is able to distinguish which auxiliary breaker is sending the data report. The data sent from the auxiliary breaker may include load current, ground fault current and/or other collected and/or calculated data. The data may be real-time data or data stored in the nonvolatile memory within the auxiliary breaker 120. The data may be helpful to the primary breaker 110 for tripping diagnosis and load diagnosis of the auxiliary breakers 120.

The processor may include a communication circuit 145 that may receive and/or transmit communication from and/or to the primary breaker based on the voltage level of the address input signal 165. The communication circuit 145 may be part of the processor 155 or may be separate from the processor 155. The communication circuit may receive/transmit communication signals from/to the primary breaker under the control of processor 155. Processor 155 may enable or disable communication from the primary breaker based on the voltage level of the address input signal 165. For example, if a communication received from the primary breaker is determined by processor 155 to be within the range of voltages for auxiliary breaker 120, the processor may enable receipt of the communication by the communication circuit 145. If a communication received from the primary breaker is determined by processor 155 as not being within the range of voltages for auxiliary breaker 120, the processor may disable receipt of the communication by the communication circuit 145. Disabling receipt of the communication may include operations such as disabling the communication port by grounding the communication circuit 145, providing an open circuit or high impedance of the communication circuit 145, discarding data packets received by the communication circuit 145. The communication circuit 145 may transmit communication to the primary breaker at a voltage level in the range of voltages associated with the given auxiliary breaker 120. The primary breaker distinguishes between communications from various auxiliary breakers based on the voltage level of the signals associated with the communications that are received by the primary breaker.

Although FIG. 3 illustrates the circuitry inside a single auxiliary breaker 120, one or more of the auxiliary breakers 120a to 120n of FIG. 1 may have similar circuitry. The auxiliary breakers 120a to 120n may each include a processor that is configured to determine a respective input voltage of a respective input signal available to the processor, and determine that the respective input signal is addressed to the respective auxiliary breaker, responsive to the input voltage being within a respective voltage range.

Figure 4:
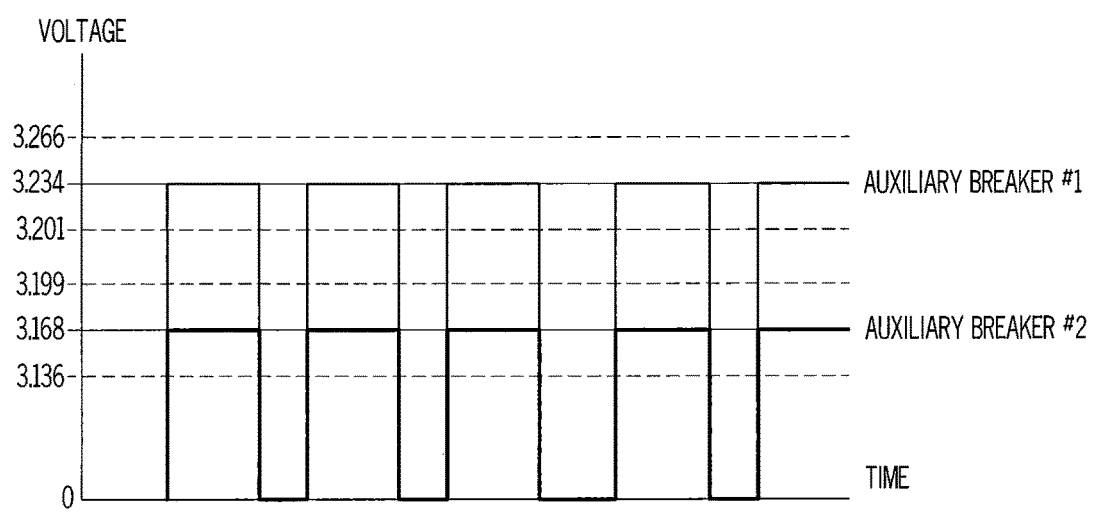
FIG. 4 illustrates threshold voltages for various auxiliary breakers, according to some embodiments of the present invention.

Continuing the present example, referring to FIG. 4, signals addressed from the primary breaker to auxiliary breaker #1 would have a mean maximum signal voltage of 3.234V and would be within a range of 3.201V to 3.266V. Similarly, signals addressed from the primary breaker to auxiliary breaker #2 would have a mean maximum signal voltage of 3.168V and would be within a range of 3.136V to 3.199V. Thus, signals within these respective ranges would be recognized by the respective processors as being addressed to the auxiliary breakers, based on upper and/or lower thresholds that are the endpoints of the voltage range for the given auxiliary breaker. Although the previous examples have been discussed in the context of the signals transmitted from the primary breaker and received by the auxiliary breakers, similar analysis and behavior would occur for signals transmitted from the auxiliary breakers to the primary breaker. A processor in the main breaker could distinguish between various signal voltage levels received from specific auxiliary breakers. The auxiliary breaker receives data from the primary breaker. The primary breaker knows the position of the auxiliary breakers when it sends data to the auxiliary. However, when the primary breaker receives data from the auxiliary breakers, the primary breaker needs a source address in the received message to recognize which auxiliary breaker that the data same from.

Figure 5:
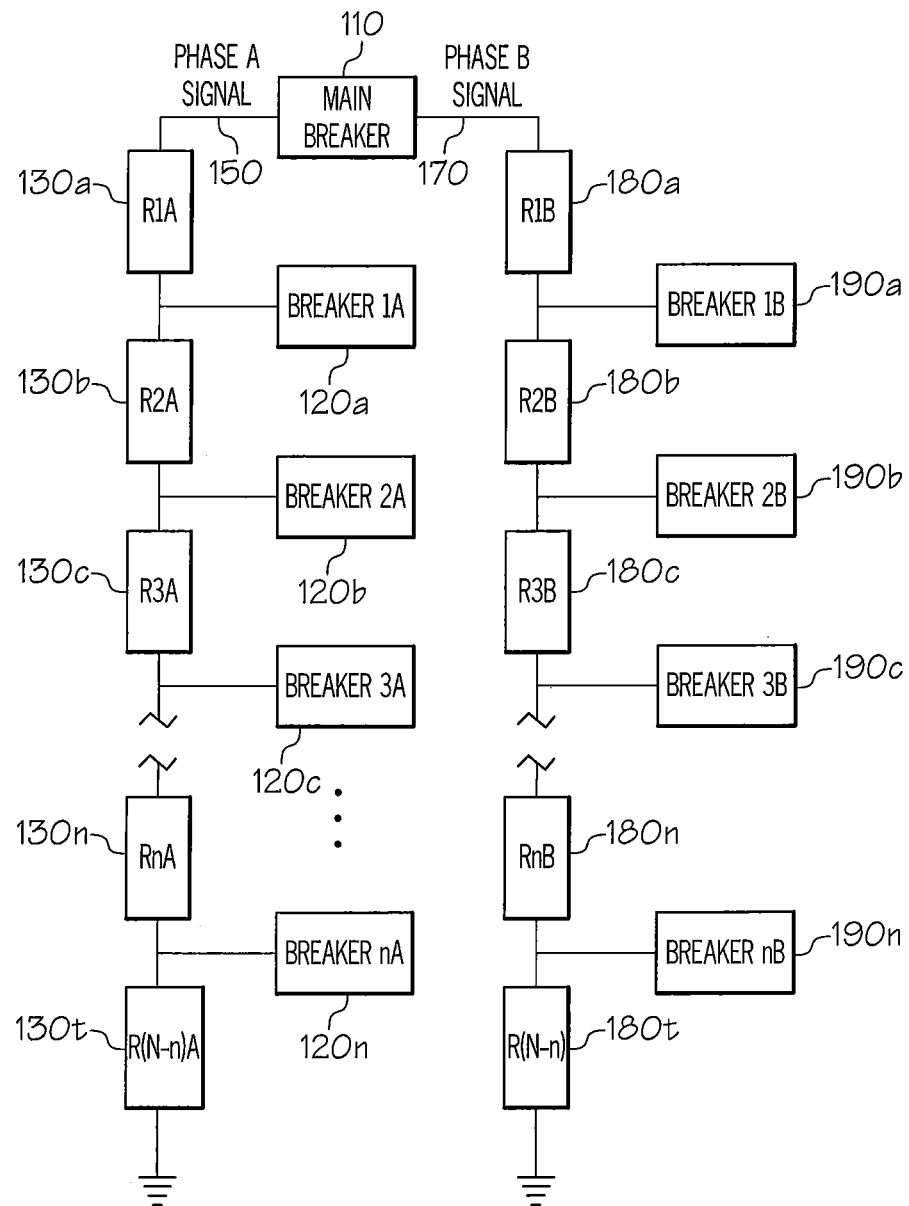
FIG. 5 illustrates an electrical distribution panel including multiple power phases, according to some embodiments of the present invention.

FIG. 5 illustrates an electrical distribution panel that includes multiple power phases. The primary breaker may include a first port associated with a first single phase electrical signal, and a second port associated with a second single phase electrical signal whose phase is different from that of the first single phase electrical signal. Referring now to FIG. 5, primary breaker 110 may be capable of handling two or more power phases. A typical application would include a three-phase power system. The electrical distribution panel may have three input power bus lines that enter and are each associated with separate, electrically isolated ports of the main breaker 110. For ease of discussion, FIG. 5 illustrates two phases of signals from the primary breaker 110, specifically a first phase signal 150 (i.e. phase A) and a second phase signal 170 (i.e. phase B) from two different ports of the primary breaker 110, although more phases of power may be handled by the multi-phase electrical distribution panel. Each of the first phase and second phase signals has a dedicated branch of auxiliary breakers. In other words, each of the auxiliary breakers is associated with a single signal phase branch.

Still referring to FIG. 5, the first phase signal 150 is associated with auxiliary breakers 120a-120n, resistive elements 130a-130n, and terminating resistor 130t whereas the second phase signal 170 is associated with auxiliary breakers 190a-190n, resistive elements 180a-180n, and terminating resistor 180t. Each phase branch of FIG. 5 operates similarly as described with respect to the single branch of FIG. 1. Specifically, the second phase signal 170 may experience a voltage drop across resistive element 180a such that the resulting voltage divided signal would be input to auxiliary breaker 190a. Similarly, resistive elements 180b-180n provide voltage drops of the signal from the main breaker 110 before presenting the resulting signals to the respective auxiliary breakers 190b-190n. The multiphase electrical distribution panel may include a terminating resistor 180t that is connected to ground. The terminating resistor 180t may be electrically connected from a first port of the terminating resistor 180t to the respective second port of a last one of the resistive elements that is electrically farthest away from the primary breaker 110. The terminating resistor 180t may be electrically connected to ground from a second port of the terminating resistor 180t.

Figure 6:
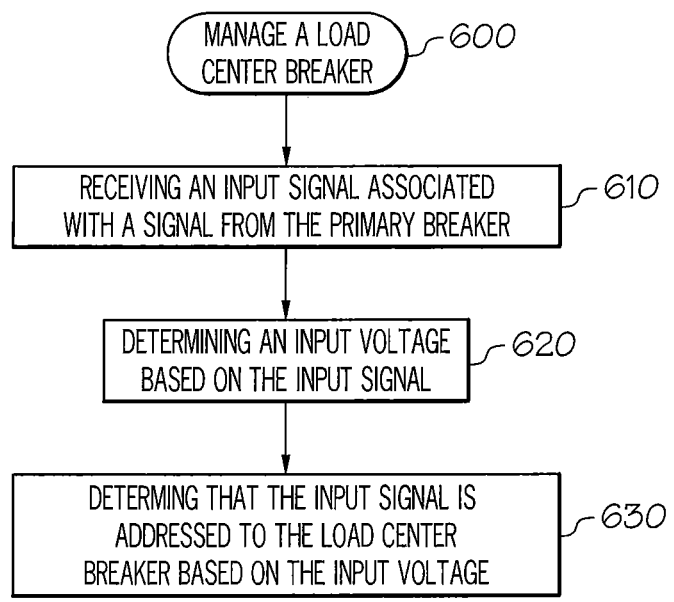
FIG. 6 is a flowchart of operations for managing a load center breaker, according to some embodiments of the present invention.

FIG. 6 is a flowchart of operations for managing a load center breaker. Referring now to FIG. 6, managing a load center breaker at block 600 may include receiving an input signal associated with a signal from the primary breaker, at block 610. Managing the load center breaker may include determining an input voltage based on the input signal, at block 620. Managing the load center breaker may include determining that the input signal is addressed to the load center breaker based on the input voltage, at block 630. A communication address of the load center breaker may be based on the voltage drop of the signal from the primary breaker to the load center breaker. The operation of the load center breaker may be controlled, responsive to determining that the resulting signal is addressed to the load center breaker. The input signal for the load center breaker may be filtered by a noise rejecting filter that is between the resistive element and the primary breaker. The load center breaker may determine that the input signal is addressed to the load center breaker based on the input voltage being within a voltage range associated with the load center breaker. The load center breaker may map the voltage of the input signal to an address value. The address value may be quantized to an allowable address value. The load center breaker may determine that the address input signal is addressed to the load center breaker based on the allowable address value being associated with the load center breaker.

Figure 7:
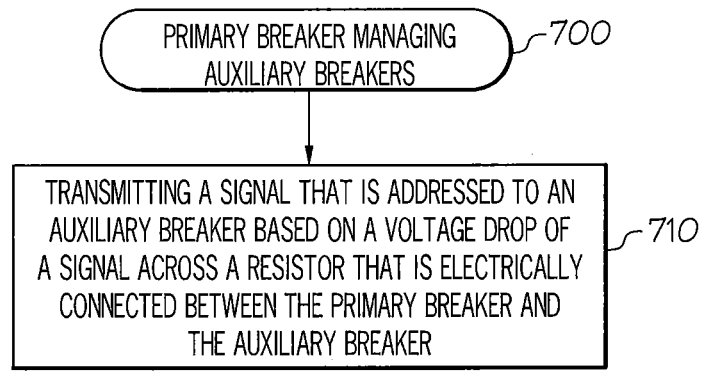
FIG. 7 is a flowchart of operations by a primary breaker for managing auxiliary breakers, according to some embodiments of the present invention.

FIG. 7 is a flowchart of operations by a primary breaker for managing auxiliary breakers. Referring now to FIG. 7, the primary breaker manages auxiliary breakers, at block 700. Managing auxiliary breakers may include transmitting a signal that is addressed to an auxiliary breaker based on a voltage drop of a signal across a resistive element, such as a resistor, that is electrically connected between the primary breaker and the auxiliary breaker.

Various embodiments presented herein have described an electrical distribution panel and related methods for addressing auxiliary breakers for communication from a primary breaker based on voltage drops across resistive elements. The described embodiments provide automatic addressing for communication with auxiliary breakers based on voltage division. The techniques for load center addressing described herein provide an efficient solution for addressing multiple auxiliary breakers for communication from a primary breaker.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the invention.

That which is claimed is:

1. An electrical distribution panel comprising:
   a primary breaker;
   an auxiliary breaker; and
   a resistive element electrically connected between the primary breaker and the auxiliary breaker, the resistive element configured to provide a resulting signal based on a voltage drop of a signal from the primary breaker to the auxiliary breaker,
   wherein a communication address of the auxiliary breaker is based on the voltage drop of the signal from the primary breaker to the auxiliary breaker.

2. The electrical distribution panel of claim 1, wherein the auxiliary breaker comprises a first auxiliary breaker, wherein the resistive element comprises a first resistive element, and wherein the first resistive element is electrically connected to the primary breaker at a first port of the first resistive element and is electrically connected to the first auxiliary breaker at a second port of the first resistive element, the electrical distribution panel further comprising:
   one or more additional auxiliary breakers; and
   one or more additional resistive elements associated with respective ones of the one or more additional auxiliary breakers,
   wherein a first one of the one or more additional resistive elements is electrically connected to the first auxiliary breaker and the first resistive element at a first port of the first one of the one or more additional resistive elements, wherein the first one of the one or more additional resistive elements is electrically connected to a respective one of the one or more additional auxiliary breakers at a second port of the first one of the one or more additional resistive elements, and wherein respective communication addresses of the one or more additional auxiliary breakers are based on respective voltage drops of respective signals across respective ones of the one or more additional resistive elements.

3. The electrical distribution panel of claim 2, wherein remaining ones of the one or more additional resistive elements are electrically connected to a previous one of the one or more additional resistive elements and electrically connected to a previous one of the one or more additional auxiliary breakers at a respective first port of the remaining ones of the one or more additional resistive elements, and are electrically connected to respective ones of the one or more additional auxiliary breakers at a respective second port of the remaining ones of the one or more additional resistive elements.

4. The electrical distribution panel of claim 2, wherein resistance values of each of the one or more additional resistive elements are the same as a resistance value of the first resistive element.

5. The electrical distribution panel of claim 3, further comprising:

a terminating resistor electrically connected from a first port of the terminating resistor to the respective second port of a last one of the remaining ones of the one or more additional resistive elements, and electrically connected to ground from a second port of the terminating resistor.

6. The electrical distribution panel of claim 1, wherein the signal comprises a single phase electrical signal associated with a single port of the primary breaker.

7. The electrical distribution panel of claim 6, wherein the single port of the primary breaker comprises a first port of the primary breaker, and wherein the single phase electrical signal comprises a first single phase electrical signal, the primary breaker further comprising:

a second port associated with a second single phase electrical signal whose phase is different from that of the first single phase electrical signal.

8. The electrical distribution panel of claim 7, the electrical distribution panel further comprising:

one or more second single phase auxiliary breakers; and
one or more second single phase resistive elements associated with respective ones of the one or more second single phase auxiliary breakers, wherein a first port of the first one of the one or more second single phase resistive elements is electrically connected to the second port of the primary breaker, wherein a second port of the first one of the one or more second single phase resistive elements is electrically connected to a first one of the one or more second single phase auxiliary breakers, and wherein respective first ports of remaining ones of the one or more second single phase resistive elements are electrically connected to a second port of a previous one of the one or more second single phase resistive elements and electrically connected to a respective one of the one or more second single phase auxiliary breakers.

9. The electrical distribution panel of claim 1, wherein the auxiliary breaker comprises:

a noise rejecting filter that reduces noise in the resulting signal to produce a noise-reduced signal that is input to a processor.

10. The electrical distribution panel of claim 1, wherein the auxiliary breaker comprises a processor configured to perform operations comprising:

determining an input voltage of an input signal associated with the resulting signal; and
determining that the resulting signal is addressed to the auxiliary breaker, responsive to the input voltage being within a voltage range.

11. The electrical distribution panel of claim 10, wherein the processor is further configured to perform operations comprising:

controlling the operation of the auxiliary breaker, responsive to the determining that the resulting signal is addressed to the auxiliary breaker.

12. The electrical distribution panel of claim 10, wherein the auxiliary breaker further comprises:

a noise rejecting filter that reduces noise in the resulting signal to produce the input signal that is input to the processor.

13. The electrical distribution panel of claim 10, wherein the determining that the resulting signal is addressed to the auxiliary breaker, responsive to the input voltage being within the voltage range comprises:

mapping the input voltage to an address value;
quantizing the address value to an allowable address value; and
determining that the resulting signal is addressed to the auxiliary breaker based on the allowable address value being associated with the auxiliary breaker.

14. The electrical distribution panel of claim 2, wherein the one or more additional auxiliary breakers comprise respective one or more processors that are configured to perform operations comprising:

determining a respective input voltage of a respective input signal available to the respective one of the one or more processors; and
determining that the respective input signal is addressed to a respective one of the one or more additional auxiliary breakers, responsive to the respective input voltage being within a respective voltage range.

15. A method of managing a load center breaker, the method comprising:

receiving, by a processor of the load center breaker, an input signal associated with a signal from a primary breaker whose voltage has been scaled by a resistive element that is electrically connected between the load center breaker and the primary breaker;
determining, by the processor of the load center breaker, an input voltage based on the input signal; and
determining, by the processor of the load center breaker, that the input signal is addressed to the load center breaker based on the input voltage.

16. The method of claim 15, further comprising:

controlling operation of the load center breaker, responsive to the determining that the input signal is addressed to the load center breaker.

17. The method of claim 15, wherein the input signal is responsive to a noise rejecting filter between the resistive element and the primary breaker.

18. The method of claim 15, wherein the determining that the input signal is addressed to the load center breaker based on the input voltage comprises:
   determining that the input voltage is within a voltage range associated with the load center breaker.

19. The method of claim 18, wherein the determining that the input voltage is within the voltage range comprises:
   mapping the input voltage to an address value;
   quantizing the address value to an allowable address value; and
   determining that the input signal is addressed to the load center breaker based on the allowable address value being associated with the load center breaker.

20. A primary breaker in a load center, the primary breaker comprising a processor that is configured to perform operations comprising:
   transmitting, by the processor of the primary breaker, a signal that is addressed to an auxiliary breaker based on a voltage drop of the signal across a resistor that is electrically connected between the primary breaker and the auxiliary breaker.

* * * * *

UNITED STATES PATENT AND TRADEMARK OFFICE
CERTIFICATE OF CORRECTION

PATENT NO. : 10,498,113 B2  
APPLICATION NO. : 15/623991  
DATED : December 3, 2019  
INVENTOR(S) : Jian Jiao Page 1 of 1

It is certified that error appears in the above-identified patent and that said Letters Patent is hereby corrected as shown below:

On the Title Page

Item (73) Assignee: Please correct "Dublin (IE)" to read -- Dublin 4 (IE) --

Signed and Sealed this
Fifth Day of May, 2020

Andrei Iancu
*Director of the United States Patent and Trademark Office*